United States Patent
Ramamoorthy

(10) Patent No.: US 9,847,687 B2
(45) Date of Patent: Dec. 19, 2017

(54) MULTIPHASE INDUCTION MOTOR WITH FLUX WEAKENING

(71) Applicant: CATERPILLAR INC., Peoria, IL (US)

(72) Inventor: Krishnakumar Ramamoorthy, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 457 days.

(21) Appl. No.: 14/658,537

(22) Filed: Mar. 16, 2015

(65) Prior Publication Data
US 2016/0276889 A1    Sep. 22, 2016

(51) Int. Cl.
| | |
|---|---|
| H02K 3/28 | (2006.01) |
| F02N 11/08 | (2006.01) |
| H02K 17/12 | (2006.01) |
| H02P 25/18 | (2006.01) |
| H02P 25/20 | (2006.01) |
| F02N 11/04 | (2006.01) |
| H02K 17/42 | (2006.01) |

(52) U.S. Cl.
CPC ............... *H02K 3/28* (2013.01); *H02K 17/12* (2013.01); *H02P 25/184* (2013.01); *H02P 25/20* (2013.01); *F02N 11/04* (2013.01); *H02K 17/42* (2013.01); *H02K 2213/03* (2013.01)

(58) Field of Classification Search
CPC .......... H02K 3/28; H02K 17/12; H02K 17/42; H02K 2213/03; F02N 11/04; F02N 11/0859; H02P 25/184; H02P 25/20
USPC ........................................................ 310/179
See application file for complete search history.

(56) References Cited

U.S. PATENT DOCUMENTS

| | | | |
|---|---|---|---|
| 1,418,779 | A | 6/1922 | Creedy |
| 5,019,766 | A * | 5/1991 | Hsu .............. H02K 3/28 310/184 |
| 5,650,707 | A | 7/1997 | Lipo et al. |
| 5,977,679 | A | 11/1999 | Miller et al. |

(Continued)

FOREIGN PATENT DOCUMENTS

| | | | | |
|---|---|---|---|---|
| EP | 2717432 | A1 * | 4/2014 | ............ H02K 3/12 |
| JP | 2001-304001 | | 10/2001 | |

(Continued)

OTHER PUBLICATIONS

Translation of foreign Patent Document PT 104152 A (Year: 2010).*

(Continued)

*Primary Examiner* — Alex W Mok
(74) *Attorney, Agent, or Firm* — Finnegan, Henderson, Farabow, Garrett & Dunner, LLP

(57) ABSTRACT

An electrical induction motor may include a stator with a plurality of circumferentially spaced slots, and N windings installed in the slots and each configured to be connected between two current inputs from an inverter, with a phase angle difference between the two current inputs equal to H×180°/N, wherein H=a harmonic of a current drive waveform supplied by the inverter to the windings. Each of the N windings may be installed in the plurality of slots to form a top layer of winding and a bottom layer of winding, with a phase angle of the current flowing through the top layer of winding in each slot being aligned with a phase angle of current flowing through the bottom layer of winding at a first, higher harmonic, and out of alignment at a second, lower harmonic.

20 Claims, 5 Drawing Sheets

(56) References Cited

U.S. PATENT DOCUMENTS

| | | | |
|---|---|---|---|
| 6,456,033 B1 | 9/2002 | Nishimura | |
| 8,258,665 B2 * | 9/2012 | Edelson | H02K 3/12 310/179 |
| 2014/0333170 A1 * | 11/2014 | Sutrisna | H02K 3/12 310/208 |
| 2014/0361646 A1 * | 12/2014 | Saito | H02K 3/28 310/51 |
| 2015/0035395 A1 * | 2/2015 | Trainer | H02K 1/16 310/71 |

FOREIGN PATENT DOCUMENTS

| | | | | |
|---|---|---|---|---|
| JP | 2005-6400 | | 1/2005 | |
| JP | 10-98859 | | 4/2010 | |
| JP | 2013176185 A | * | 9/2013 | |
| JP | 2013236481 A | * | 11/2013 | |
| PT | 104152 A | * | 2/2010 | H02K 17/14 |
| WO | WO 2010/013226 | | 2/2010 | |
| WO | WO 2013/041202 | | 3/2013 | |

OTHER PUBLICATIONS

Osama et al., "Modeling and Analysis of a Wide-Speed-Range Induction Motor Drive Based on Electronic Pole Changing", *IEEE Transactions on Industry Applications*, vol. 33, No. 5, (1997).

Miller el al., "Design Considerations for an Automotive Integrated Starter-Generator with Pole-Phase Modulation", *IEEE Transactions on Industry Applications*, pp. 2366-2373 (2001).

* cited by examiner

MULTIPHASE INDUCTION MOTOR WITH FLUX WEAKENING

TECHNICAL FIELD

The present disclosure relates generally to multiphase induction motors and, more particularly, to a multiphase induction motor with flux weakening.

BACKGROUND

Machines, such as, for example, track-type tractors and other off-highway vehicles including construction, agriculture, and mining machines, are used to perform many tasks. To effectively perform these tasks, such machines require a power source that provides significant power to a drive system. The power source may be an engine such as, for example, a turbine engine, diesel engine, gasoline engine, or natural gas engine operated to generate a torque output at a range of speeds. This torque is typically provided to one or more traction devices via a transmission operably connected to the engine via the drive system.

To start such machines, a starter motor with the capability of generating a large amount of torque at low speeds is needed. Often the amount of electrical power required to operate a starter motor for a relatively short period of time can significantly drain the available power in a portable energy storage device such as a battery. In order to maintain sufficient power in the battery for multiple starts of the power source, an electrical generator such as an alternator is often provided to generate the electrical power needed to recharge the battery. If an induction motor is used as both a starter motor and as an alternator to generate electrical power, the induction motor must be able to operate at lower speeds and higher torque when starting the machine, and at higher speeds and lower torque while still generating sufficient power in its capacity as an alternator or generator.

An exemplary induction motor used as both a starter and an alternator is described in U.S. Pat. No. 5,977,679 (the '679 patent) issued to Miller et al. on Nov. 2, 1999. The '679 patent describes an induction motor including a stator having a cylindrical core with a plurality of inner and outer slots and a plurality of toroidal coils wound about the core and laid in the inner and outer slots. The design of the induction motor in the '679 patent is said to enable arbitrary combination of the number of poles and phases of the motor, thus allowing for smooth torque operation in the alternator mode.

Although the induction motor disclosed in the '679 patent may provide some advantages in allowing an induction motor to be used in both a starter mode and as an alternator, the motor still experiences a variety of drawbacks. For example, in order for the induction motor in the '679 patent to transition from engine cranking to alternator mode, the number of phases must be changed to accommodate a change in a number of poles. This required change in the number of phases also results in a significant increase in the electronic complexity of an inverter that is connected to the coils of the motor to allow multiphase operation.

The disclosed systems and methods are directed to overcoming one or more of the problems set forth above.

SUMMARY

In an exemplary embodiment of the present disclosure, an electrical induction motor may be configured to receive N separate current inputs at N separate terminals from N output phases of a N-phase inverter. The motor may comprise a stator including a plurality of circumferentially spaced slots, a rotor rotatably mounted within the stator, and N windings connected to the N separate terminals and a plurality of contactors. Each of the plurality of contactors may be configured to be selectively opened or closed in a circuit including the N windings to selectively connect the N windings together in one of a mesh configuration or a star configuration. Each of the N windings may be configured to be selectively connected between two of the N separate current inputs, with a phase angle difference between the two separate current inputs equal to H×180°/N, wherein H=a harmonic of a current drive waveform supplied by the inverter to the windings. Each of the N windings may be installed in the plurality of slots to form a top layer of winding in a radially outer portion of a first one of the slots and a bottom layer of winding in a radially inner portion of a second one of the slots, and configured to receive a current flowing through each of the N windings such that a phase angle of current flowing through the top layer of winding installed in each slot is aligned with a phase angle of current flowing through the bottom layer of winding installed in the slot at a first, higher harmonic of the current drive waveform and is out of alignment at a second, lower harmonic of the current drive waveform.

In another exemplary embodiment of the present disclosure, a method is disclosed for configuring a N-phase electrical induction motor comprising a stator and a rotor, and including N windings in a plurality of circumferentially spaced slots in the stator, and a plurality of contactors arranged in a circuit including the N windings. The method includes selectively opening or closing each of the plurality of contactors to selectively connect the N windings together in one of a mesh configuration or a star configuration. The method further includes selectively connecting each of the N windings between two of N separate current inputs from N output phases of a N-phase inverter, with a phase angle difference between the two separate current inputs equal to H×180°/N, wherein H=a harmonic of a current drive waveform supplied by the inverter to the windings. The method may still further include installing each of the N windings in the plurality of circumferentially spaced slots to form a top layer of winding in a radially outer portion of a first one of the slots and a bottom layer of winding in a radially inner portion of a second one of the slots, and supplying a current from the inverter through each of the N windings such that a phase angle of current flowing through the top layer of winding installed in each slot is aligned with a phase angle of current flowing through the bottom layer of winding installed in the slot at a first, higher harmonic of the current drive waveform and is out of alignment at a second, lower harmonic of the current drive waveform.

In a further exemplary embodiment of the present disclosure, an electrical system for a machine is disclosed. The electrical system may include a N-phase inverter and a N-phase induction motor configured to receive N separate current inputs at N separate terminals from N output phases of the N-phase inverter. The N-phase induction motor may comprise a stator including a plurality of circumferentially spaced slots, a rotor rotatably mounted within the stator, and N windings connected to the N separate terminals and a plurality of contactors. Each of the plurality of contactors is configured to be selectively opened or closed in a circuit including the N windings to selectively connect the N windings together in one of a mesh configuration or a star configuration. Each of the N windings is configured to be selectively connected between two of the N separate current inputs, with a phase angle difference between the two separate current inputs equal to H×180°/N, wherein H=a harmonic of a current drive waveform supplied by the inverter to the windings. The electrical system may still further each of the N windings installed in the plurality of slots to form a top layer of winding in a radially outer portion of a first one of the slots and a bottom layer of winding in a radially inner portion of a second one of the slots, and configured to receive a current flowing through each of the N windings such that a phase angle of current flowing through the top layer of winding installed in each slot is aligned with a phase angle of current flowing through the bottom layer of winding installed in the slot at a first, higher harmonic of the current drive waveform and is out of alignment at a second, lower harmonic of the current drive waveform.

DETAILED DESCRIPTION

Figure 1:
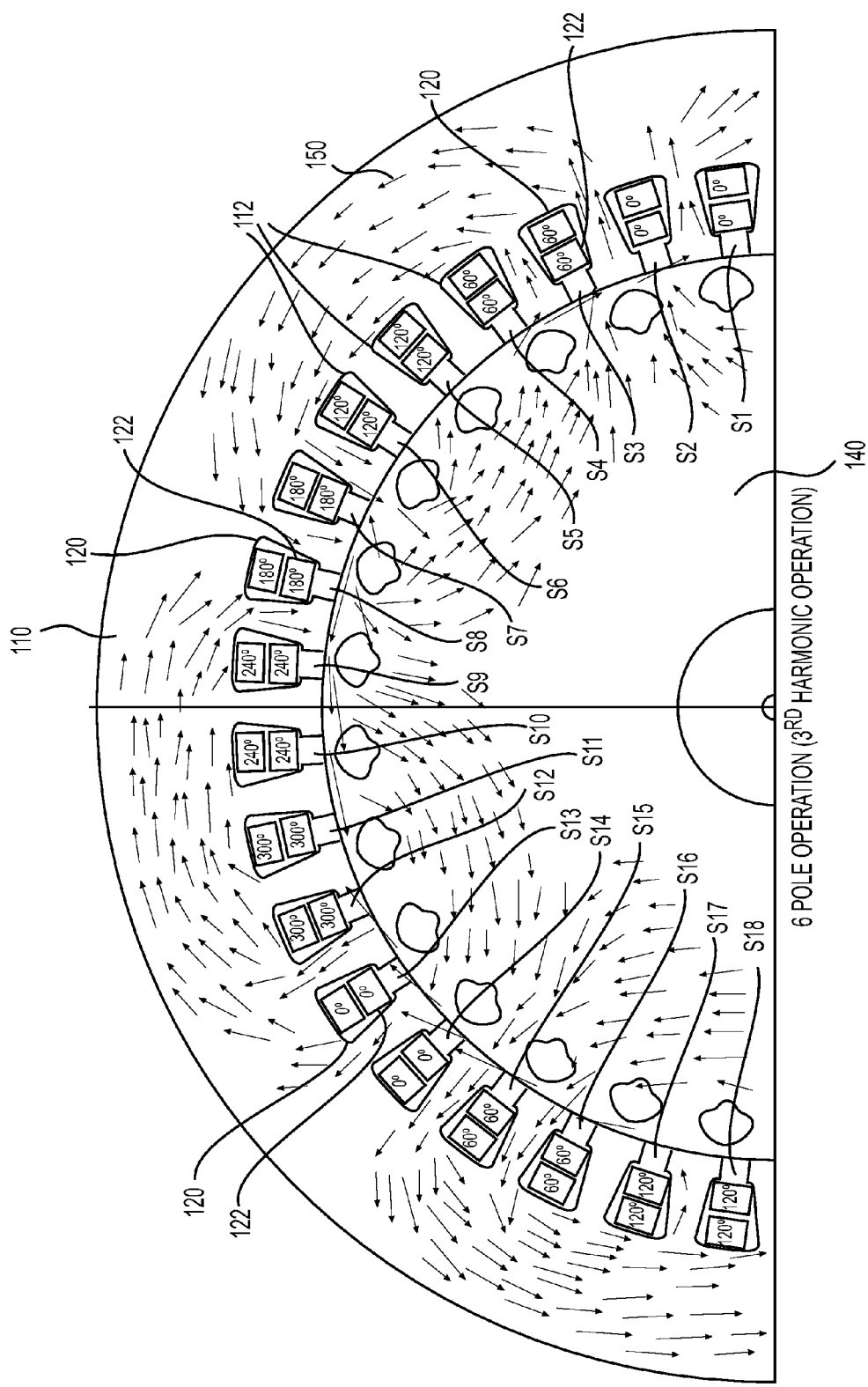
FIG. 1 is a diagrammatic illustration of the configurable windings associated with a nine phase electrical induction motor driven by a third harmonic waveform.
Figure 2:
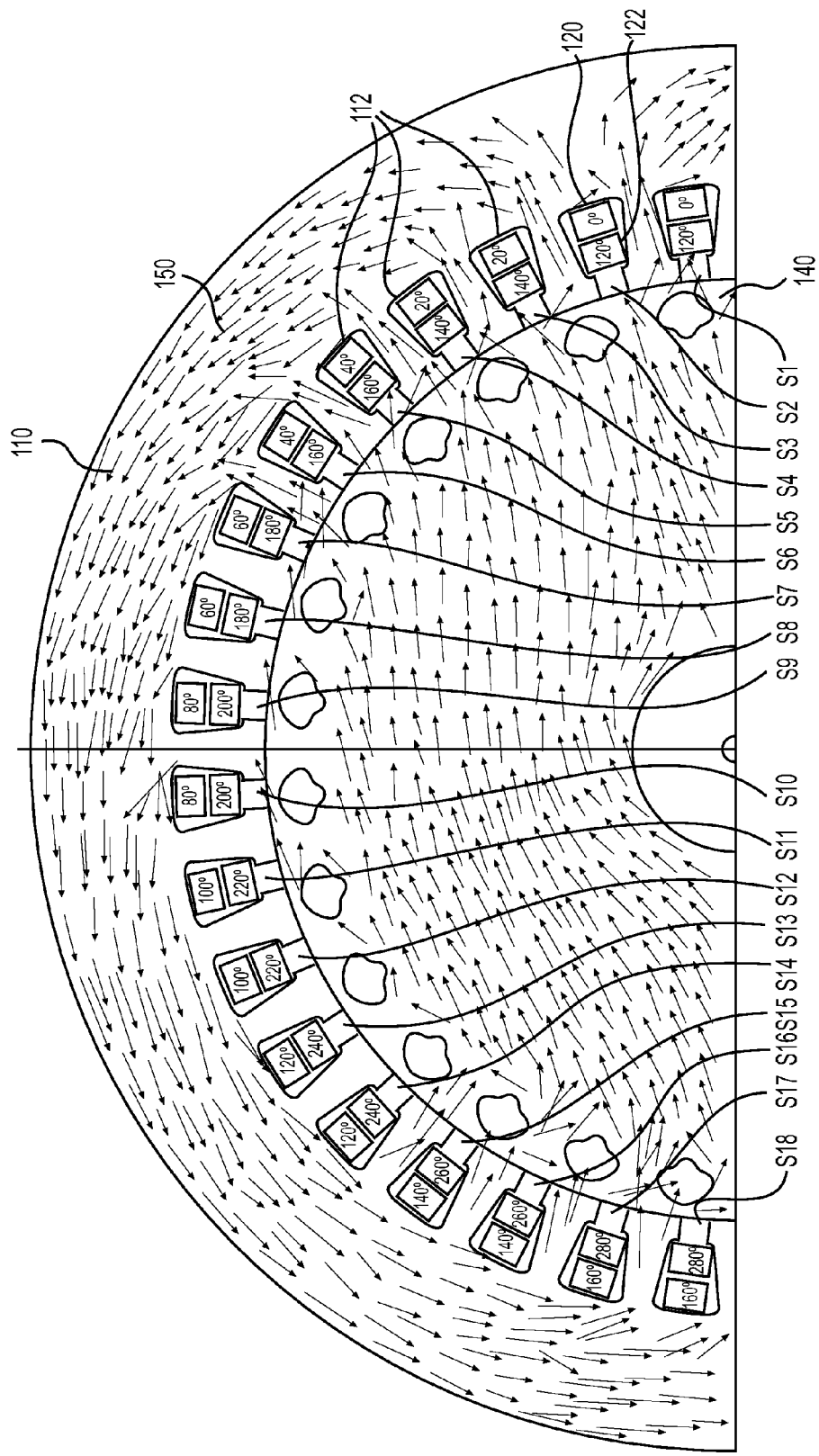
FIG. 2 is a diagrammatic illustration of the configurable windings associated with a nine phase electrical induction motor driven by a first harmonic waveform.

FIG. 1 is a diagrammatic illustration of one half of an exemplary embodiment of an electrical induction motor that includes an annular stator 110 and a rotor 140 rotatably mounted inside the stator 110. The stator 110 in the embodiment shown in FIG. 1 includes 36 circumferentially spaced slots 112 (half of which are shown in FIGS. 1 and 2, and labeled S1-S18). Windings may be installed within the stator slots, with a top layer winding 120 installed in a radially outer portion of each stator slot 112, and a bottom layer winding 122 installed in a radially inner portion of each stator slot 112. In the case of a nine phase electrical induction motor, such as shown in the exemplary embodiment of FIGS. 1 and 2, the windings installed in the slots 112 of the stator 110 may be configured to receive nine separate current inputs at nine separate terminals. Each winding may correspond to one of the nine phases of the motor. A plurality of contactors (not shown) may be provided and each of the contactors may be configured to be selectively opened or closed in a circuit including the nine windings to selectively connect the nine windings together in one of a mesh configuration or a star configuration. One of ordinary skill in the art will recognize that the number of slots in the stator and the number of windings may vary in accordance with the number of phases of the electrical induction motor. An electrical induction motor such as the nine phase motor illustrated in FIGS. 1 and 2 may be adapted for use as both a starter motor and an alternator in a machine. The machine in which the electrical induction motor may be used could include any machine that performs some type of operation associated with an industry such as mining, construction, farming, transportation, or any other industry known in the art.

The windings 120, 122 of the induction motor may be arranged in what is commonly referred to as a mesh configuration (also referred to as a delta configuration in the case of a three phase motor) or a star configuration. In a mesh or delta configuration the current that is supplied by an inverter to each terminal of the induction motor is split between two groups of windings. These groups of windings are therefore connected in parallel, and the current flowing through each winding is smaller than the total current supplied to the terminals of the winding by the inverter. The voltage across each winding in the mesh or delta configuration is the same as the total voltage supplied to the terminals of the winding by the inverter. In the case of a nine phase inverter, the inverter may provide each of nine separate current inputs to nine separate terminals of nine separate stator windings on the electrical induction motor. The nine phase induction motor may be configured to receive the nine current inputs at the nine terminals from nine output phases of the nine phase inverter. In the star configuration the opposite end of each of the windings from the end connected to one of the nine terminals is connected to a neutral point common to all of the windings. Therefore, in contrast to the mesh configuration, the star configuration provides for the same current through all of the windings as is supplied to the terminals of the windings, but the voltage is split across the windings. The star configuration may therefore allow for a higher current flow through each of the windings since the current does not get split between windings, but a lower voltage across each of the windings. The mesh configuration may provide for a lower current flow through each winding and a higher voltage across each of the windings since the voltage does not get split across the windings. The amount of torque produced by the motor is proportional to the current flowing through the windings, and the speed at which the motor rotates is proportional to the amount of voltage across each of the windings. Therefore, a star configuration enables the motor to produce more torque at lower speeds for starting applications, while a mesh or delta configuration enables the motor to rotate at higher speeds with a lower torque, such as when functioning as an alternator to generate electricity.

As an alternative to, or in addition to physically opening or closing different contactors in the circuits including the stator windings of the induction motor to change the motor between a star configuration and a mesh configuration, the number of magnetic poles of the motor may also be changed. A change in the number of magnetic poles may be implemented, for example, by a software change resulting in a change in the harmonics of a current drive waveform applied by an inverter to each of the current input terminals of the stator windings. Each of the harmonics of the current drive waveform supplied by an inverter is a component frequency of the signal that is an integer multiple of the fundamental frequency of the current drive waveform. The number of magnetic poles generated when current flows through the windings changes as the harmonics of the drive waveform are changed. Various alternative implementations may include selectively receiving a first one of the harmonics of the drive waveform for certain desired applications of the induction motor, and a second, different harmonic for other applications. As will be described in more detail below, a first application may include a low speed, high torque application such as when operating the induction motor as a starter. A second application may include a high speed, low torque application such as when operating the induction motor as an alternator or generator.

In the exemplary implementation illustrated in FIG. 1, a third harmonic of the current drive waveform applied by a nine phase inverter to the windings of a nine phase induction motor will result in six magnetic poles. Magnetic lines of flux 150 in FIG. 1 illustrate three of the six magnetic poles generated in one half of the induction motor. FIG. 2 illustrates one half of the same nine phase induction motor of FIG. 1, with only two magnetic poles being generated (one of which is shown) during the application of a first, fundamental harmonic of the current drive waveform. The magnetic poles are generated as a result of multiplying the number of sine wave peaks produced by the harmonic current drive waveform in a first, fundamental harmonic by the number of the harmonic. For example, a third harmonic will produce three times as many sine wave peaks in the current over the same period of time as the first or fundamental harmonic will produce. Therefore, the result of driving the induction motor with a higher harmonic is an increase in the number of magnetic poles generated by the flow of current through the windings of the motor. An increase in the number of poles translates into an increase in the torque produced by the induction motor. This is because the amount of torque produced is proportional to the amount of current flowing through the windings, and the winding current is a greater percentage of the total inverter current at higher harmonics of the current drive waveform. At a lower harmonic of the current drive waveform, such as during the first harmonic operation of the nine phase induction motor shown in FIG. 2, the winding current is a lower percentage of the total inverter current and the voltage across each winding is a greater percentage of the total inverter voltage. Since the voltage across each winding is proportional to the speed of the motor, a lower harmonic and decreased number of magnetic poles allows the motor to operate at the high speeds and low torque requirements of an alternator while generating power.

The advantage of changing the harmonics of the drive waveform applied by the inverter to the motor, and thereby changing the number of magnetic poles generated by the current flowing through the windings, is that the amount of torque produced by the motor and the speed of operation of the motor may be changed by electronically changing the drive waveform synthesized by the inverter. This means that physical changes to the motor, such as opening or closing switches or contactors, do not have to be made to effect a desired change in output torque or speed. The torque produced by the induction motor is proportional to the current flowing through the windings and proportional to the number of magnetic poles generated by the current drive waveform. More current flowing through the windings and more magnetic poles translates into more torque produced by the motor. The speed of the induction motor is proportional to the voltage across the windings and inversely proportional to the number of magnetic poles. More voltage across the windings and a lower number of magnetic poles translate into higher speed operation of the motor at lower torques. Furthermore, changes in the harmonics of the drive waveform provided by the inverter may be obtained in a smooth fashion, successively passing through various admixtures of harmonic components. As a result, there are no sudden discontinuities in the drive when switching between harmonic operating states.

Figure 3:
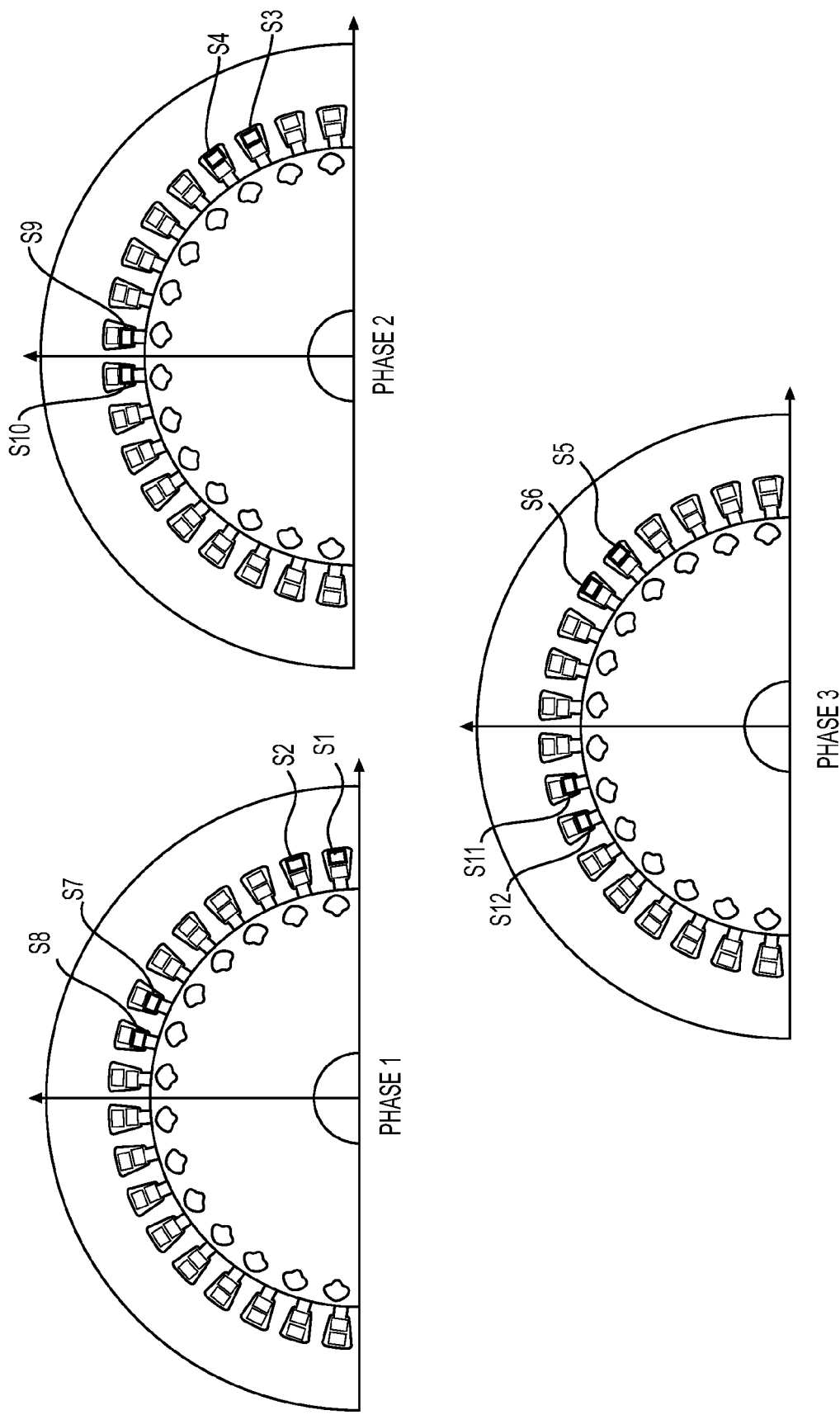
FIG. 3 is a diagrammatic illustration of the configurable windings to which each phase of a nine phase electrical induction motor is connected.
Figure 3:
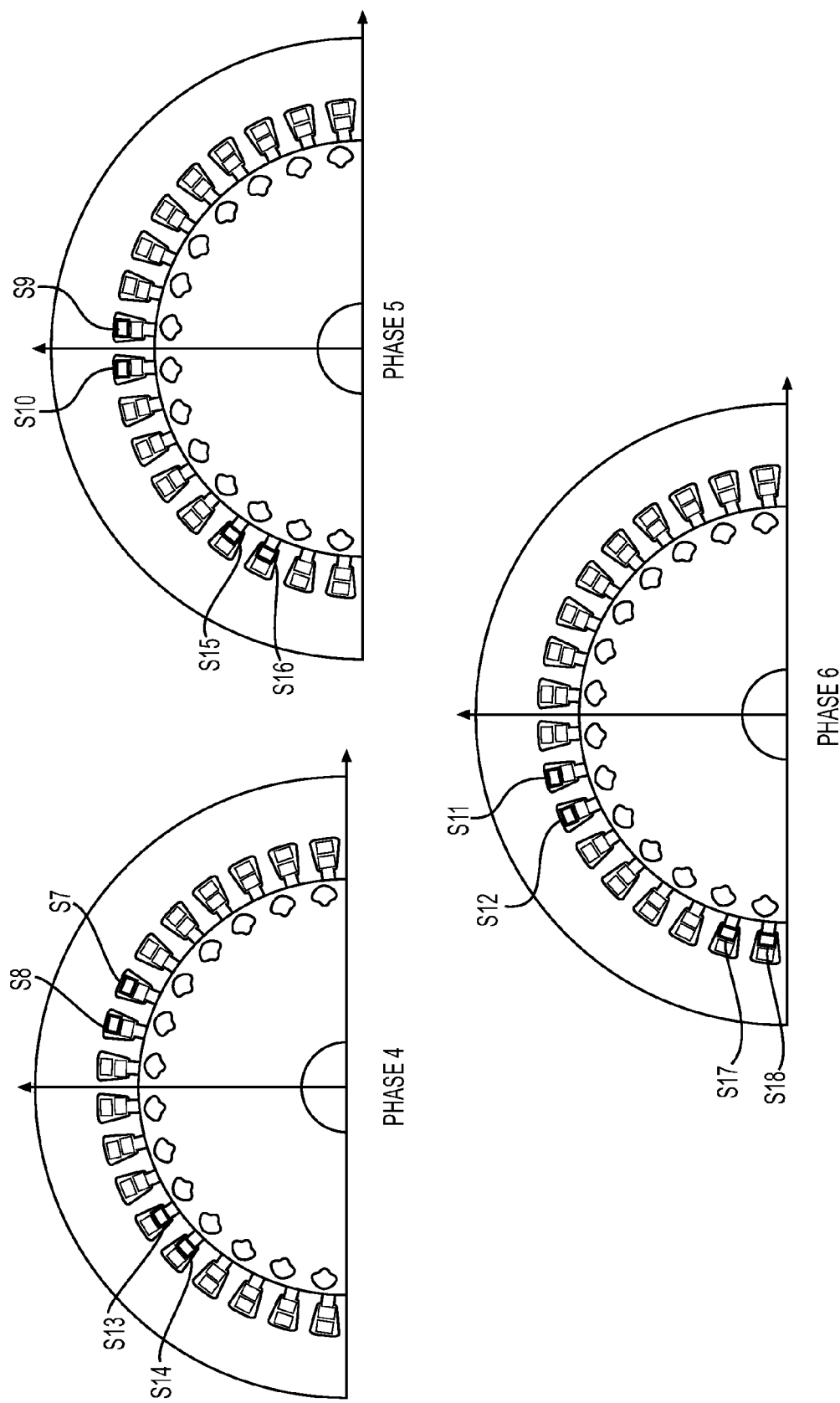
Figure 3:
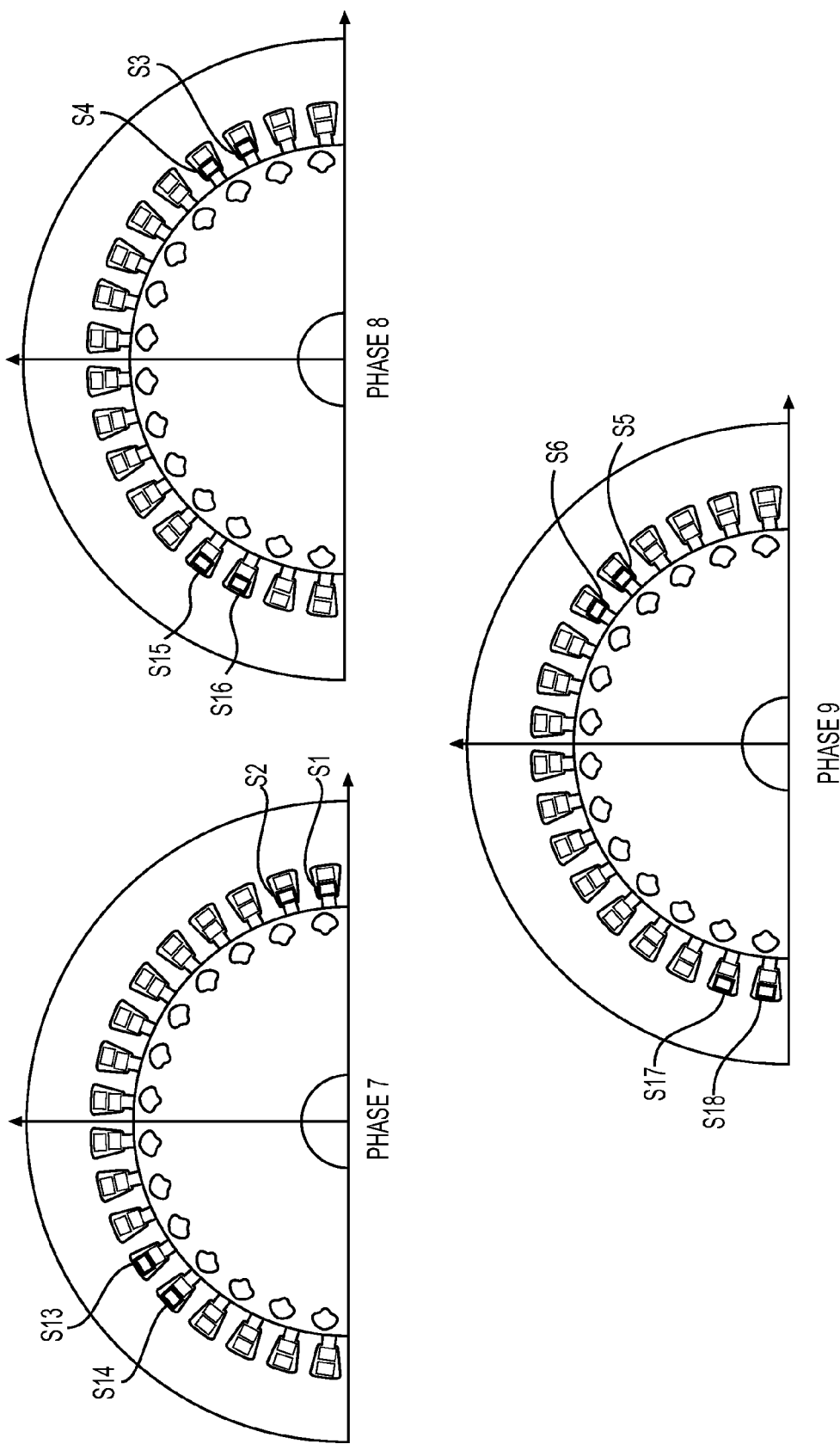

In the embodiments of a nine phase electrical induction motor illustrated in FIGS. 1 and 2, each of the windings is installed to form a top layer of winding 120 at a radially outer portion of a first slot 112 and a bottom layer of winding 122 at a radially inner portion of a second slot 112 that is located 60 degrees away from the first slot. That is, each of the windings passes into a radially outer portion of a first slot (in a direction that is into the page in FIGS. 1 and 2), and passes out of the radially inner portion of the second slot (in a direction that is out of the page). FIG. 3 illustrates the positions of each of the windings corresponding to each of the nine phases of a nine phase induction motor in accordance with an exemplary implementation of this disclosure. For example, the first phase of current (passing through the first winding) passes into a top layer of the winding 120 in a radially outer portion of first and second slots S1, S2, and out of a bottom layer of winding 122 in a radially inner portion of seventh and eighth slots S7, S8.

As shown in FIGS. 1 and 2, the phase angle of the current passing into the top layer of winding 120 in slots S1 and S2 is 0°, and the phase angle of the current passing out of the bottom layer of winding 122 in slots S7 and S8 is 180°. The windings in the exemplary nine phase electrical induction motor shown in the figures are configured such that each winding is installed in the radially outer portions of a pair of adjacent slots at a first circumferential location on the stator 110 and in the radially inner portions of a pair of adjacent slots at a second circumferential location that is 60° from the first circumferential location. The result, as illustrated by FIGS. 1 and 2, is that the current passing through the bottom layer of winding 122 in each slot 112 is 180° out of phase with the current passing through the top layer of winding 120 in a slot that is spaced 60° away.

With the above-described configuration of the windings, the current passing through each top layer of winding 120 in a particular slot 112 is in phase with the current passing through the corresponding bottom layer of winding 122 in the same slot 112 when the current drive waveform supplied to the windings is a third harmonic resulting in the generation of six magnetic poles. However, as shown in FIG. 2, when the windings of the nine phase motor are supplied with the first harmonic of the current drive waveform, producing only two magnetic poles, the phases of the current flowing through the top and bottom layers of winding 120, 122 in each slot 112 are out of alignment. Specifically, in the exemplary embodiment of FIG. 2, the current flowing through each of the top layers of winding 120 in each slot 112 is 120° out of alignment with the current flowing through the corresponding bottom layer of winding 122 in the same slot 112. As a result, the magnetic lines of flux 150 generated by the two pole operation illustrated in FIG. 2 at least partially cancel each other out and are weakened in the vicinity of each of the stator slots 112.

As illustrated in the exemplary embodiment of FIG. 3, the circumferential spacing between slots in which each winding is installed is less than 90°. The result, as illustrated in FIGS. 1 and 2, is that operation of the induction motor at a higher harmonic and greater number of poles results in a stronger magnetic flux. For the nine phase motor operating at a third harmonic of the current drive waveform and generating six magnetic poles, as illustrated in FIG. 1, the current phases are aligned in the top and bottom layers of windings 120, 122 in each of the slots 112. This mode of operation, as illustrated in FIG. 1, generates a strong magnetic flux and enough torque at a relatively low voltage, e.g., 24 volts, to meet the high torque requirements for starting a machine. When this same nine phase motor is operating at a first, fundamental harmonic of the current drive waveform and generating only two magnetic poles, as illustrated in FIG. 2, the current phases are 120° out of alignment in the top and bottom layers of windings 120, 122 in each of the slots 112. This mode of operation, as illustrated in FIG. 2, provides for a weakened magnetic flux in addition to a lower current flowing through each winding. The weakened magnetic flux at the lower number of poles also allows the motor to rotate at higher speeds, such as during applications as an alternator, without requiring an increase in the voltage. For example, the disclosed configuration of a nine phase motor operating at a first harmonic and two magnetic poles may operate at speeds in the range from approximately 4,000 to 12,000 rpm without exceeding 24 volts.

In the exemplary implementation of a nine phase induction motor, such as shown in FIGS. 1-3, the winding configuration allows the motor to operate in starting applications with a higher harmonic current drive waveform and a higher number of magnetic poles, while achieving a strong enough magnetic flux even at relatively low voltages, such as 24 volts, to generate sufficient torque for starting the machine. The weakening of the magnetic flux at lower harmonic current drive waveforms and a lower number of poles allows the motor to operate at high speeds during power generating applications without significantly increased voltages. The effect of transitioning from a strong magnetic flux at higher harmonics of the current drive waveform and a higher number of magnetic poles to a weakened magnetic flux at lower harmonics and a lower number of poles may result in a range of speeds of rotation of the motor where the motor is not being used for starting the engine or for generating electrical power. This intermediate range of operation of the motor as disclosed herein is above the low speeds encountered while starting a machine, and below the high speeds encountered when the motor is used to generate power. Therefore, the "dead zone" for the motor at these intermediate speeds falls within a range of speeds where high torque is no longer needed to start the engine since the engine is already running, but the engine has not yet reached normal operating conditions best suited for the generation of electrical power.

A N-phase inverter (not shown) connected to the induction motor at each of N terminals may be capable of supplying alternating current of variable voltage and variable frequency to the motor. The inverter may also be used with the induction motor when the induction motor is functioning as an alternating current generator. The inverter may embody a single microprocessor or multiple microprocessors, along with hardware including other electronic components such as insulated gate bipolar transistors (IGBT) and comparators that may be included in pulse-width modulation circuits, firmware, and software, or various combinations of all of the above. Various other known circuits may be associated with the inverter, including power supply circuitry, signal-conditioning circuitry, solenoid driver circuitry, communication circuitry, and other appropriate circuitry.

Methods of configuring a multiphase electrical induction motor with weakened magnetic flux during high speed operation will be described in detail in the following section.

INDUSTRIAL APPLICABILITY

The disclosed multiphase electrical induction motor with configurable windings and weakened flux during high speed operation may be used as both a starter and as an alternator or generator of electrical power. When used as a starter, the induction motor is required to produce sufficient torque for starting the engine of the machine on which it is mounted. The amount of torque that the induction motor can produce may be proportional to the amount of current flowing through each of the windings on the stator of the motor. Torque produced may also be proportional to the number of magnetic poles generated by the current flowing through the windings of the motor and the strength of the magnetic flux lines produced by the poles. In one exemplary implementation, a N-phase inverter connected to a N-phase induction motor may be configured to receive one or more signals indicative of a request to operate the motor to start an engine. The inverter may then process these signals and send corresponding signals to the N terminals of the N-phase induction motor. The induction motor may be configured to receive the one or more signals from the inverter and process the one or more signals in order to selectively open or close each of a plurality of contactors to selectively connect the windings together in one of a mesh configuration or a star configuration.

The induction motor may be further configured by selectively connecting each of the N windings of the N-phase motor between two of N separate current inputs from N output phases of a N-phase inverter. The phase angle difference between the two separate current inputs may be equal to H×180°/N, wherein H=a harmonic of a current drive waveform supplied by the inverter to the windings.

Each of the N windings of the N-phase electrical induction motor may be installed in a plurality of circumferentially spaced slots 112 in the stator 110 to form a top layer of winding 120 in a radially outer portion of a first one of the slots 112 and a bottom layer of winding 122 in a radially inner portion of a second one of the slots 112. The induction motor may be configured such that a current supplied from the N-phase inverter through each of the N windings results in a phase angle of the current flowing through the top layer of winding 120 installed in each slot 112 being aligned with a phase angle of current flowing through the bottom layer of winding 122 installed in the slot 112 at a first, higher harmonic of the current drive waveform. The current flowing through the top layer of winding 120 installed in each slot 112 may be out of alignment with the phase angle of current flowing through the bottom layer of winding 122 installed in the slot 112 at a second, lower harmonic of the current drive waveform. In one or more implementations of this disclosure, the induction motor may be configured by installing each of the N windings to form a top layer of winding 120 in a first group of at least two circumferentially adjacent slots 112 and a bottom layer of winding 122 in a second group of at least two circumferentially adjacent slots 112. Each of the N windings may be installed in a radially outer portion of a first slot and a radially inner portion of a second slot circumferentially spaced from the first slot by less than 90 degrees. In the case of a nine phase induction motor, each of the nine windings may be installed in a radially outer portion of a first slot and a radially inner portion of a second slot that is spaced approximately 60° from the first slot.

In one exemplary implementation, a nine phase electrical induction motor may be configured to receive signals indicative of a request to operate the motor to start an engine. The nine phase motor may process the signals to selectively receive a third harmonic of the current drive waveform generated by a nine phase inverter. If desired, the nine phase motor may also process the signals to selectively open or close each of a plurality of contactors to establish a star configuration. The third harmonic current drive waveform for the nine phase motor may result in the generation of six magnetic poles, with the top and bottom layers of windings 120, 122 in each of the stator slots 112 being in phase alignment for the generation of a strong magnetic flux. The result is the generation of a high torque at low speeds and low voltages for the starting application.

The nine phase electrical induction motor may also receive signals indicative of a request to operate the motor as an alternator to generate electricity. The nine phase motor may process these signals to selectively receive a first, fundamental harmonic of the current drive waveform generated by a nine phase inverter. The nine phase motor may also process the signals to selectively open or close each of the plurality of contactors to establish a mesh configuration. The first harmonic current drive waveform for the nine phase motor may result in the generation of two magnetic poles, with the top and bottom layers of windings 120, 122 in each of the stator slots 112 being out of phase alignment for the generation of a weakened magnetic flux. The result is the operation of the motor at high speeds and low torque while maintaining the voltage at relatively low levels. The disclosed winding configuration enables a higher magnetic flux when the induction motor is operated at higher harmonics and a greater number of poles to achieve a high starting torque at relatively low voltages. Switching the motor to a lower harmonic and lower number of poles with weakened magnetic flux allows the motor to achieve high speeds at lower torques for generation of power at relatively low voltages.

It will be apparent to those skilled in the art that various modifications and variations can be made to the induction motor of the present disclosure. Other embodiments of the induction motor and methods of configuring the induction motor will be apparent to those skilled in the art after consideration of the specification and practice of the methods disclosed herein. It is intended that the specification and examples be considered as exemplary only, with a true scope of the disclosure being indicated by the following claims and their equivalents.

What is claimed is:

1. An electrical induction motor configured to receive N separate current inputs at N separate terminals from N output phases of a N-phase inverter, the motor comprising:
    a stator comprising a plurality of circumferentially spaced slots;
    a rotor rotatably mounted within the stator; and
    N windings connected to the N separate terminals and a plurality of contactors, wherein each of the plurality of contactors is configured to be selectively opened or closed in a circuit including the N windings to selectively connect the N windings together in one of a mesh configuration or a star configuration;
    each of the N windings being configured to be selectively connected between two of the N separate current inputs, with a phase angle difference between the two separate current inputs equal to H×180°/N, wherein H=a harmonic of a current drive waveform supplied by the inverter to the windings; and
    each of the N windings being installed in the plurality of slots to form a top layer of winding in a radially outer portion of a first one of the slots and a bottom layer of winding in a radially inner portion of a second one of the slots, and configured to receive a current flowing through each of the N windings such that a phase angle of the current flowing through the top layer of winding installed in each slot is aligned with a phase angle of current flowing through the bottom layer of winding installed in the slot at a first, higher harmonic of the current drive waveform and is out of alignment at a second, lower harmonic of the current drive waveform.

2. The electrical induction motor of claim 1, wherein N equals 9.

3. The electrical induction motor of claim 1, wherein each of the N windings forms a top layer of winding in a first group of at least two circumferentially adjacent slots and a bottom layer of winding in a second group of at least two circumferentially adjacent slots.

4. The electrical induction motor of claim 1, wherein the first and second slots are circumferentially spaced apart from each other by less than 90 degrees.

5. The electrical induction motor of claim 1, wherein N equals 9, and wherein the motor is further configured to receive one or more signals indicative of a request to operate the motor to start an engine, and configured to process the one of more signals in order to selectively receive a third harmonic of the current drive waveform generated by the nine phase inverter.

6. The electrical induction motor of claim 1, further configured to receive one or more signals indicative of a request to operate the motor to start an engine, and configured to process the one or more signals in order to selectively open or close each of the plurality of contactors to establish the star configuration.

7. The electrical induction motor of claim 1, wherein N equals 9, and wherein the motor is further configured to receive one or more signals indicative of a request to operate the motor as an alternator to generate electricity, and configured to process the one of more signals in order to selectively receive a first, fundamental harmonic of the current drive waveform generated by the nine phase inverter.

8. The electrical induction motor of claim 1, further configured to receive one or more signals indicative of a request to operate the motor as an alternator to generate electricity, and configured to process the one or more signals in order to selectively open or close each of the plurality of contactors to establish the mesh configuration.

9. The electrical induction motor of claim 1, wherein N equals 9, and wherein the phase angle of current flowing through the top layer of winding installed in each slot is aligned with a phase angle of current flowing through the bottom layer of winding installed in the slot at a third harmonic of the drive waveform, and is 120 degrees out of alignment at a first, fundamental harmonic of the current drive waveform.

10. A method for configuring a N-phase electrical induction motor comprising a stator and a rotor, and including N windings in a plurality of circumferentially spaced slots in the stator, and a plurality of contactors arranged in a circuit including the N windings, the method comprising:
    selectively opening or closing each of the plurality of contactors to selectively connect the N windings together in one of a mesh configuration or a star configuration;
    selectively connecting each of the N windings between two of N separate current inputs from N output phases of a N-phase inverter, with a phase angle difference between the two separate current inputs equal to H×180°/N, wherein H=a harmonic of a current drive waveform supplied by the inverter to the windings;
    installing each of the N windings in the plurality of circumferentially spaced slots to form a top layer of winding in a radially outer portion of a first one of the slots and a bottom layer of winding in a radially inner portion of a second one of the slots; and
    supplying a current from the inverter through each of the N windings such that a phase angle of current flowing through the top layer of winding installed in each slot is aligned with a phase angle of current flowing through the bottom layer of winding installed in the slot at a first, higher harmonic of the current drive waveform and is out of alignment at a second, lower harmonic of the current drive waveform.

11. The method of claim 10, wherein N equals 9.

12. The method of claim 10, further comprising installing each of the N windings to form a top layer of winding in a first group of at least two circumferentially adjacent slots and a bottom layer of winding in a second group of at least two circumferentially adjacent slots.

13. The method of claim 10, further comprising installing each of the windings in a radially outer portion of a first slot and a radially inner portion of a second slot circumferentially spaced from the first slot by less than 90 degrees.

14. The method of claim 10, further comprising:
configuring a nine phase electrical induction motor to receive one or more signals indicative of a request to operate the motor to start an engine; and
processing the one of more signals in order to selectively receive a third harmonic of the current drive waveform generated by a nine phase inverter.

15. The method of claim 10, further comprising:
receiving one or more signals indicative of a request to operate the motor to start an engine; and
processing the one or more signals in order to selectively open or close each of the plurality of contactors to establish the star configuration.

16. The method of claim 10, further comprising:
configuring a nine phase electrical induction motor to receive one or more signals indicative of a request to operate the motor as an alternator to generate electricity; and
processing the one of more signals in order to selectively receive a first, fundamental harmonic of the current drive waveform generated by a nine phase inverter.

17. The method of claim 10, further comprising:
receiving one or more signals indicative of a request to operate the motor as an alternator to generate electricity; and
processing the one or more signals in order to selectively open or close each of the plurality of contactors to establish the mesh configuration.

18. The method of claim 10, further comprising:
configuring a nine phase electrical induction motor to receive a phase angle of current flowing through the top layer of winding installed in each slot that is aligned with a phase angle of current flowing through the bottom layer of winding installed in the slot at a third harmonic of the current drive waveform, and is 120 degrees out of alignment at a first, fundamental harmonic of the current drive waveform.

19. An electrical system for a machine, the electrical system comprising:
a N-phase inverter; and
a N-phase induction motor configured to receive N separate current inputs at N separate terminals from N output phases of the N-phase inverter;
the N-phase induction motor comprising:
a stator, wherein the stator comprises a plurality of circumferentially spaced slots;
a rotor rotatably mounted within the stator; and
N windings connected to the N separate terminals and a plurality of contactors,
wherein each of the plurality of contactors is configured to be selectively opened or closed in a circuit including the N windings to selectively connect the N windings together in one of a mesh configuration or a star configuration,
wherein each of the N windings is configured to be selectively connected between two of the N separate current inputs, with a phase angle difference between the two separate current inputs equal to H×180°/N, wherein H=a harmonic of a current drive waveform supplied by the inverter to the windings, and
wherein each of the N windings is installed in at least two of the plurality of slots to form a top layer of winding in a radially outer portion of a first one of the at least two slots and a bottom layer of winding in a radially inner portion of a second one of the at least two slots, and configured to receive a current flowing through the winding such that a phase angle of the current flowing through the top layer of winding installed in the first slot is aligned with a phase angle of current flowing through the bottom layer of winding installed in the first slot at a first, higher harmonic of the current drive waveform and is out of alignment at a second, lower harmonic of the current drive waveform.

20. The electrical system of claim 19, wherein the N-phase induction motor is a nine phase induction motor further configured to:
receive one or more first signals indicative of a request to operate the motor to start an engine;
process the one or more first signals in order to selectively receive the third harmonic of the current drive waveform generated by the nine phase inverter;
receive one or more second signals indicative of a request to operate the motor as an alternator to generate electricity; and
process the one or more second signals in order to selectively receive the first, fundamental harmonic of the current drive waveform generated by the nine phase inverter.

* * * * *